US012798515B2

(12) United States Patent
Gudapati

(10) Patent No.: US 12,798,515 B2
(45) Date of Patent: Nov. 17, 2026

(54) ENHANCED VEHICLE SECUREMENT SYSTEM

(71) Applicant: FCA US LLC, Auburn Hills, MI (US)

(72) Inventor: Abhilash Gudapati, Auburn Hills, MI (US)

(73) Assignee: FCA US LLC, Auburn Hills, MI (US)

(*) Notice: Subject to any disclaimer, the term of this patent is extended or adjusted under 35 U.S.C. 154(b) by 98 days.

(21) Appl. No.: 18/913,377

(22) Filed: Oct. 11, 2024

(65) Prior Publication Data

US 2026/0103166 A1 Apr. 16, 2026

(51) Int. Cl.

| | |
|---|---|
| ***B60R 25/06*** | (2006.01) |
| ***B60R 25/24*** | (2013.01) |
| ***B60R 25/30*** | (2013.01) |
| ***B60R 25/31*** | (2013.01) |
| ***G07C 9/00*** | (2020.01) |

(52) U.S. Cl.

CPC .............. *B60R 25/06* (2013.01); *B60R 25/24* (2013.01); *B60R 25/305* (2013.01); *B60R 25/31* (2013.01); *G07C 9/00309* (2013.01); *G07C 2009/00587* (2013.01); *G07C 2009/00984* (2013.01); *G07C 2209/08* (2013.01); *G07C 2209/63* (2013.01)

(58) Field of Classification Search

CPC ....... B60R 25/06; B60R 25/24; B60R 25/305; B60R 25/31; G07C 9/00309; G07C 2009/00587; G07C 2009/00984; G07C 2209/08; G07C 2209/63

See application file for complete search history.

(56) References Cited

U.S. PATENT DOCUMENTS

| | | | | |
|---|---|---|---|---|
| 5,696,679 | A * | 12/1997 | Marshall | F16H 63/3416 701/1 |
| 8,029,409 | B2 * | 10/2011 | Vermeersch | B60R 25/066 701/2 |
| 11,046,287 | B1 * | 6/2021 | Schafer | B60R 25/007 |
| 2003/0144112 | A1 * | 7/2003 | Burgbacher | F16H 63/483 477/99 |
| 2008/0045381 | A1 * | 2/2008 | Vermeersch | B60R 25/066 477/99 |
| 2010/0326148 | A1 * | 12/2010 | Gierling | F16H 63/483 70/247 |

(Continued)

FOREIGN PATENT DOCUMENTS

WO WO-2013072471 A1 * 5/2013 ............. B60R 25/04

*Primary Examiner* — Nay Tun

(74) *Attorney, Agent, or Firm* — Jeremy J. Klobucar

(57) ABSTRACT

A vehicle system includes a controller to detect a key associated with the vehicle, detect if a driver door is ajar/removed, and initiate an automatic vehicle securement feature, if (i) user-requested, or (ii) a shifter is moved to Park and the driver door is ajar or removed, and engage a park pawl to thereby prevent the vehicle from driving away. The controller monitors a driver presence sensor, physically locks the shifter while the vehicle is in Park and keeps the park pawl engaged without regard to a requested non-park state from the shifter, if (i) the driver presence transitions to 'not present' or (ii) a key status indicates the key status transitions to 'not present'. The controller requests a key search if the driver presence transitions to 'present', and disengages the park pawl in response to the requested non-park state when the requested key search indicates the key is 'present'.

20 Claims, 7 Drawing Sheets

(56) References Cited

U.S. PATENT DOCUMENTS

| | | | | |
|---|---|---|---|---|
| 2011/0068895 | A1* | 3/2011 | Gee | E05B 77/48 340/5.67 |
| 2012/0232765 | A1* | 9/2012 | Holub | B60R 25/08 701/66 |
| 2018/0128371 | A1* | 5/2018 | Ulrey | F16H 61/22 |
| 2023/0089472 | A1* | 3/2023 | Yamaguchi | B60R 25/243 340/5.53 |
| 2024/0308385 | A1* | 9/2024 | Gudapati | B60L 55/00 |

* cited by examiner

ENHANCED VEHICLE SECUREMENT SYSTEM

FIELD

The present application relates generally to vehicle control systems and, more particularly, to vehicle control systems that provide operator re-authentication for vehicle un-securement.

BACKGROUND

Automotive vehicles typically include an internal combustion engine and/or one or more electric motors powered by a battery system. In some applications, the owner/driver may leave the vehicle ON and unattended. For example, an electrified vehicle may be utilized as a generator to power a variety of external loads ranging from light loads (e.g., camping equipment) to heavy loads (e.g., a household). Because the vehicles are on/powered-up, however, this creates a situation where the vehicles are subject to theft. For example, an unauthorized individual could gain access to and then physically move the vehicle, such as by actuating a manual park release. Accordingly, while such conventional vehicles do work well for their intended purpose, there exists an opportunity for improvement in the relevant art.

SUMMARY

In accordance with one example aspect of the invention, a vehicle system having an automatic vehicle securement feature to prevent a vehicle from driving away is provided. In one example implementation, the vehicle system includes a shifter configured to move the vehicle between Park, Reverse, Neutral, and Drive (PRND) positions, a brake system controller configured to selectively engage and disengage a park pawl, an occupant restraint controller configured to determine a buckled or unbuckled status of a driver seat belt, a body computer configured to determine if a driver door is ajar or removed from the vehicle, a driver presence sensor configured to determine a driver presence within the vehicle, and a radio frequency hub module (RFHM) configured to detect a key status of a key associated with the vehicle.

A controller, having one or more processors, is in signal communication with the shifter, the brake system controller, the occupant restraint controller, the body computer, the driver presence sensor, and the RFHM. The controller is programmed to detect for the key associated with the vehicle; detect if the driver door is ajar or removed; initiate the automatic vehicle securement feature, if (i) requested by a user, or (ii) if the shifter is moved to Park and the driver door is ajar or removed, and engage the park pawl to thereby prevent the vehicle from driving away; monitor the driver presence sensor; physically lock the shifter while the vehicle is in Park and keep the park pawl engaged without regard to a requested non-park state from the shifter, if (i) the driver presence transitions to 'not present' or (ii) the key status indicates the key status transitions to 'not present'; request a key search if the driver presence transitions to 'present'; and disengage the park pawl in response to the requested non-park state from the shifter when the requested key search indicates the key is 'present'.

In addition to the foregoing, the described vehicle system may include one or more of the following features: wherein the controller is further programmed to request a key authorization when the requested key search indicates the key is 'not present'; wherein the controller is further programmed to request a second key search if a user performs the key authorization, and disengage the park pawl in response to the requested non-park state from the shifter when the requested second key search indicates the key is 'present'; wherein the key authorization requires a user to perform a vehicle unlock operation with the key.

In addition to the foregoing, the described vehicle system may include one or more of the following features: wherein the controller is further programmed to detect the key is a key fob associated with the vehicle, detect the key fob has a low battery, set a timer the first time the key fob is detected as having the low battery, and disable the automatic vehicle securement feature if the timer has expired; and wherein the controller is further programmed to detect the driver presence sensor is faulted or unavailable, disengage the park pawl in response to the requested non-park state from the shifter when the driver door is present and (i) the driver seat belt is buckled and the driver door is closed, and (ii) the key status indicates the key is 'present', and request a second key search if a brake pedal is pressed, and at least one of (i) the driver seat belt is unbuckled and the driver door is ajar, and (ii) the key status indicates the key is 'not present', and subsequently disengage the park pawl in response to the requested non-park state from the shifter when the requested second key search indicates the key is 'present'.

In addition to the foregoing, the described vehicle system may include one or more of the following features: wherein the controller is further programmed to detect the driver presence sensor is faulted or unavailable, disengage the park pawl in response to the requested non-park state from the shifter when the driver door is removed and at least one of (i) the driver seat belt is buckled, and (ii) the key status indicates the key is 'present', and request a second key search if a brake pedal is pressed, and at least one of (i) the driver seat belt is unbuckled, and (ii) the key status indicates the key is 'not present', and subsequently disengage the park pawl in response to the requested non-park state from the shifter when the requested second key search indicates the key is 'present'.

In addition to the foregoing, the described vehicle system may include one or more of the following features: wherein the driver presence sensor is a seat sensor; and wherein the driver presence sensor is an interior camera of a camera-based driver monitoring system.

In accordance with another example aspect of the invention, a computer-implemented method of operating a vehicle system having an automatic vehicle securement feature to prevent a vehicle from driving away is provided. In one example implementation, the vehicle includes a shifter configured to move the vehicle between Park, Reverse, Neutral, and Drive (PRND) positions, a brake system controller configured to selectively engage and disengage a park pawl, an occupant restraint controller configured to determine a buckled or unbuckled status of a driver seat belt, a body computer configured to determine if a driver door is ajar or removed from the vehicle, a driver presence sensor configured to determine a driver presence within the vehicle, a radio frequency hub module (RFHM) configured to detect a key status of a key associated with the vehicle, and a controller having one or more processors and a non-transitory computer-readable storage medium.

In one example implementation, the method includes detecting, by the controller, the key associated with the vehicle; detecting, by the body computer, if the driver door is ajar or removed; initiating, by the controller, the automatic vehicle securement feature, if (i) requested by a user, or (ii)

if the shifter is moved to Park and the driver door is ajar or removed, and engaging the park pawl to thereby prevent the vehicle from driving away; monitoring, by the controller, the driver presence sensor; physically locking the shifter, by the controller, while the vehicle is in Park and keeping the park pawl engaged without regard to a requested non-park state from the shifter, if (i) the driver presence transitions to 'not present' or (ii) the key status indicates the key status transitions to 'not present'; requesting, by the controller, a key search if the driver presence transitions to 'present'; and disengaging the park pawl in response to the requested non-park state from the shifter when the requested key search indicates the key is 'present'.

In addition to the foregoing, the described method may include one or more of the following features: requesting, by the controller, a key authorization when the requested key search indicates the key is 'not present', requesting, by the controller, a second key search if a user performs the key authorization, and disengaging, by the controller, the park pawl in response to the requested non-park state from the shifter when the requested second key search indicates the key is 'present'; and wherein the key authorization requires a user to perform a vehicle unlock operation with the key.

In addition to the foregoing, the described method may include one or more of the following features: detecting, by the controller, the key is a key fob associated with the vehicle; detecting, by the controller, the key fob has a low battery; setting, by the controller, a timer the first time the key fob is detected as having the low battery; and disabling, by the controller, the automatic vehicle securement feature if the timer has expired.

In addition to the foregoing, the described method may include one or more of the following features: detecting, by the controller, the driver presence sensor is faulted or unavailable; disengaging, by the controller, the park pawl in response to the requested non-park state from the shifter when the driver door is present and (i) the driver seat belt is buckled and the driver door is closed, and (ii) the key status indicates the key is 'present'; and requesting, by the controller, a second key search if a brake pedal is pressed, and at least one of (i) the driver seat belt is unbuckled and the driver door is ajar, and (ii) the key status indicates the key is 'not present', and subsequently disengaging the park pawl in response to the requested non-park state from the shifter when the requested second key search indicates the key is 'present'.

In addition to the foregoing, the described method may include one or more of the following features: detecting, by the controller, the driver presence sensor is faulted or unavailable; disengaging, by the controller, the park pawl in response to the requested non-park state from the shifter when the driver door is removed and at least one of (i) the driver seat belt is buckled, and (ii) the key status indicates the key is 'present'; and requesting, by the controller, a second key search if a brake pedal is pressed, and at least one of (i) the driver seat belt is unbuckled, and (ii) the key status indicates the key is 'not present', and subsequently disengaging the park pawl in response to the requested non-park state from the shifter when the requested second key search indicates the key is 'present'.

In addition to the foregoing, the described method may include one or more of the following features: wherein the driver presence sensor is a seat sensor; and wherein the driver presence sensor is an interior camera of a camera-based driver monitoring system.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
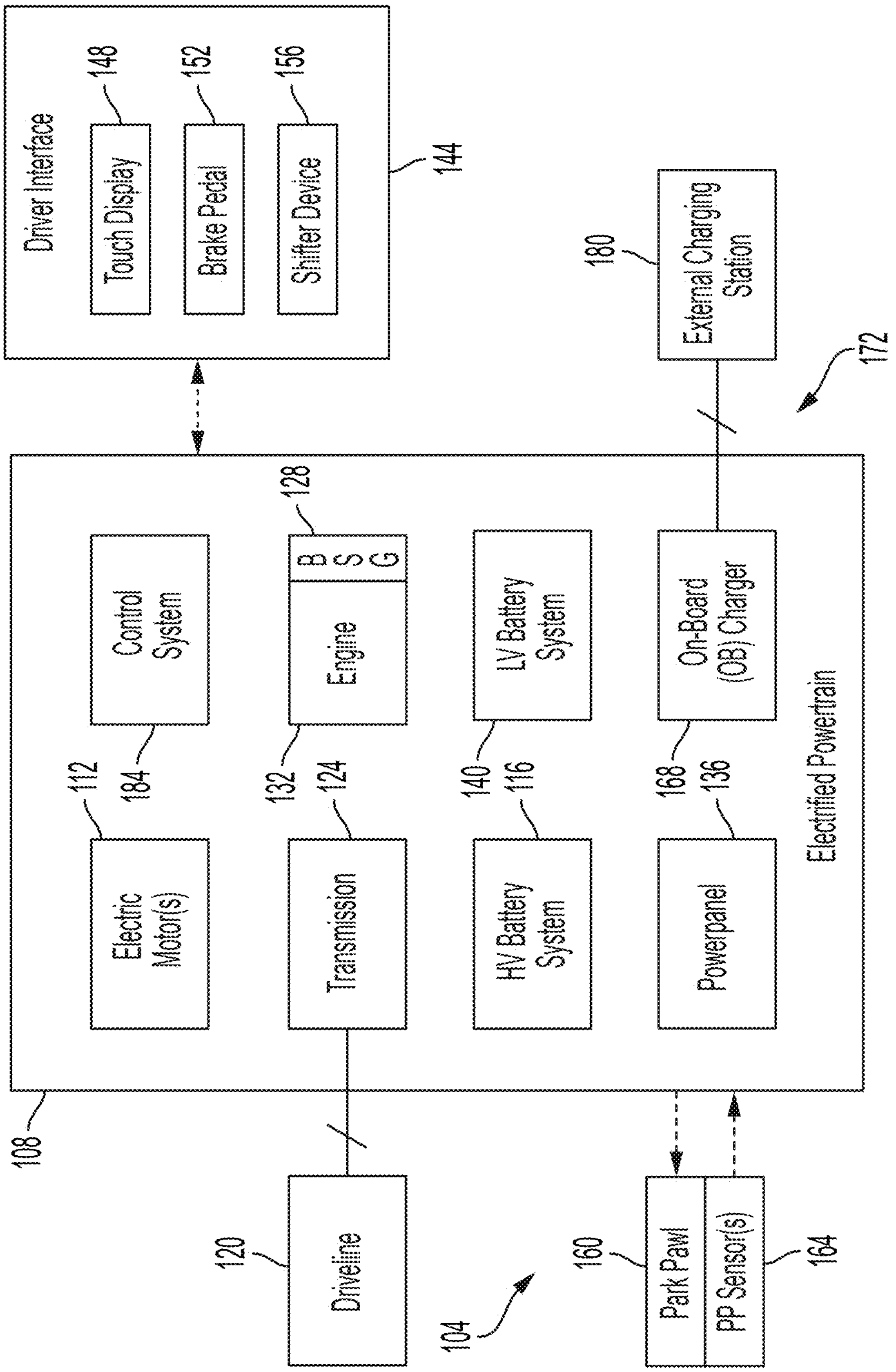
FIG. 1 is a functional block diagram of an electrified vehicle having an example securement system according to the principles of the present application.

As previously discussed, a vehicle owner may leave their vehicle ON and unattended in some scenarios, such as when operating in a power generation mode. However, this may subject the vehicle to possible theft. Accordingly, described herein are systems and methods for vehicle securement during idling ("Secure Idle"), and subsequent operator re-authentication to unsecure the vehicle for further use.

In general, the vehicle is equipped with a vehicle securement feature to prevent a vehicle from unintentionally driving away. If proper enabling conditions are detected, the vehicle will activate the vehicle securement feature, for example, by automatically engaging a vehicle park pawl or electronic parking brake (ePB). The system will not allow the vehicle to be unsecured without proper re-authentication via a key fob or other authorized device, thereby preventing vehicle theft.

In one example, the system provides multiple methods of key fob searching, and also utilizes a driver presence mechanism to reduce the number of key searches to protect the key fob battery life. As a failsafe, the system also allows the driver to perform a manual maneuver to ensure the key fob is found with one search (e.g., when key is left in a truck bed). Because the key fob is required to be inside the vehicle in order drive away, the system reduces the number key fob searches in order to prevent battery drain thereof.

The Secure Idle feature is configured to prevent the vehicle from being driven away when the vehicle is ON and the driver leaves the vehicle while in Park. A subsequent key authentication or key being present in the vehicle is required for the vehicle to shift out of Park. The Secure Idle feature may be selected on an infotainment module or may be automatically managed by a supervisory controller when the ignition is left ON with the propulsion system active.

The Secure Idle feature will be activated with the ignition ON and the propulsion system active. The ignition ON condition may be necessary for range extended or conventional vehicles where an engine can be used to extend the power usage/discharge when a high voltage (HV) battery depletes to a lower state of charge (SOC). However, a driver may choose to use a battery electric vehicle (BEV) or conventional ICE vehicle with the ignition ON and propulsion system active as well.

The general expectation is that the driver will lock the vehicle if they require the ignition to be ON and leave the vehicle unattended. However, even with safely locking the doors, scenarios may still exist where an unauthorized individual still opens the vehicle and can drive the vehicle away. In other scenarios, the driver may forget to lock the doors. Moreover, even if the doors are locked, the driver may leave the vehicle idling with the door not completely closed, the vehicle may have removable doors, or the doors may be unable to close due to latch faults.

Accordingly, the control system described herein is configured to prevent unauthorized drive away by providing a re-authentication mechanism for all kinds of vehicles, eliminate corner cases/fault cases, and ensure key fob battery life is maintained when the vehicle is left idling. The control system and Secure Idle feature may include one or more features of the system described in commonly owned U.S. patent application Ser. No. 18/182,451, filed on Mar. 13, 2023, the entire contents of which are incorporated herein by reference thereto.

As described herein, the vehicle securement feature is configured to be activated in several notable scenarios. The first scenario occurs when the vehicle doors are removed, and the vehicle includes a selectable Secure Idle option. In this first scenario, the driver selects Secure Idle on an infotainment screen (e.g., display screen). The Secure Idle feature is activated when the vehicle is in Park, and a human machine interface (HMI) notification is provided (e.g., "Secure Idle Active" with a chime). It will be appreciated that the notifications described herein are merely exemplary and the notifications may take any suitable form or variation. When the supervisory controller detects the doors are removed, it begins monitoring a driver seat presence sensor or driver camera information (if available).

A second scenario occurs when the driver door is not closed, and the vehicle includes the selectable Secure Idle option. In this second scenario, the driver selects the Secure Idle feature on the infotainment screen. The Secure Idle feature is activated when the vehicle is shifted into Park, and an HMI notification is provided indicating the feature is active. When the supervisory controller detects the doors are open, it begins monitoring the driver seat presence sensor or driver camera information, if available.

A third scenario occurs when the vehicle doors are removed on a vehicle without the Secure Idle selectable option. In this scenario, the Secure Idle feature is activated when the vehicle shifts to Park, and an HMI notification is provided indicating the feature is active. The supervisory controller detects the doors are removed, and begins monitoring the driver seat presence sensor or driver camera information, if available.

A fourth scenario occurs when the driver door is not closed and the vehicle does not have the selectable Secure Idle option. In this scenario, the Secure Idle feature is activated when the vehicle shifts to Park, and an HMI notification is provided indicating the feature is active. The supervisory controller detects the door has not transitioned to a closed state from open, and beings monitoring the driver seat presence sensor or driver camera information, if available.

Each of the four scenarios include common behaviors. If the driver door was never opened, the driver can shift out of park and drive away, and a new key fob search is not required. If the driver presence sensor(s) or key status did not transition from 'present' to 'not present' then the driver can shift out of park and drive away and a new key search is not required. If the key status changes from 'present' to 'not present' OR the driver presence sensor indicates the driver has left the vehicle and the key fob is still present, a new key fob search is required. The supervisory controller then secures the vehicle in Park (e.g., park pawl or ePB), and may optionally physically secure the shifter in the Park position.

Upon driver re-entry, through detection of the driver presence sensor(s), the supervisory controller requests a key search. If the key is detected as 'present' in the vehicle OR if the key status transitioned from 'not present' to 'present' without a key search, the driver can shift out of Park and drive away. If the key is not detected, the HMI may display a notification that authorization is required for driveability. If the key fob is not detected inside the vehicle interior, but at a different location of the vehicle, the HMI may display a notification that authorization is required for driveability. The 'authorization is required for driveability' may require the driver to perform an unlock of the vehicle, which triggers a new key search. Once detected/authorized, the driver can shift out of Park and drive away.

In scenarios where either or both of the driver presence seat sensor and the driver presence camera sensor fail to provide an input, or the supervisory controller does not receive signals from the driver presence sensor(s), the system is operated based on whether the vehicle has doors present or doors removed.

Where the vehicle doors are present, the system operates as follows. (i) If the driver selected Secure Idle or the supervisory controller enables Secure Idle and monitors for key status, if a seat belt status transitions from buckled to unbuckled, the driver door is ajar, the vehicle is shifted to Park, or if the key status transitions from 'present' to 'not present,' the supervisory controller will require a new key search. (ii) If the key status transitions from 'not present' to 'present,' then a new key fob search is not requested by the supervisory controller. (iii) If the key fob status is 'not present' OR the driver door is ajar and the driver seat belt is buckled with the vehicle in Park, the supervisory controller requests a key search based on the brake pedal being pressed or the driver seat belt transitioning from unbuckled to buckled. If the key fob is detected as 'present' the user can drive away. If the key fob is not detected, the controller provides an HMI notification that authorization is required for driveability. (iv) Authorization requires the driver to perform an unlock of the vehicle, which triggers a new key search. The driver can shift out of Park and drive away once the key fob is detected.

Where the vehicle doors are removed, the system operates as follows. (i) If the driver selects the Secure Idle feature or when automatically engaged, the supervisory controller enables Secure Idle and monitors for the key fob status. If the driver seat belt status transitions from buckled to unbuckled, the vehicle is shifted to Park, or if the key fob status transitions from 'present' to 'not present,' the supervisory controller requires a new key fob search. (ii) If the key fob status is 'not present' OR the driver seat belt is buckled while the vehicle is in Park, the supervisory controller requests a key fob search based on the brake pedal being pressed or the driver seat belt transitioning from unbuckled to buckled. If the key fob is detected, the driver can drive away. If the key fob is not detected, the controller provides an HMI notification that authorization is required for driveability. (iii) Authorization requires the driver to perform an unlock of the vehicle, which triggers a new key search. The driver can shift out of Park and drive away once the key fob is detected.

In scenarios where the key fob battery is low, the system is configured to operate as follows. Where all inputs are present and the key fob battery is detected to be LOW (e.g., <20% life), when the vehicle is cranked, a Secure Idle timer is set for a predetermined time (e.g., 10 days). Once the predetermined time has elapsed, if the driver uses the key fob or the vehicle is equipped only with a key fob, the supervisory controller provides an HMI notification that Secure Idle is disabled because the key fob battery is low. The HMI notification may then be displayed each time the vehicle is turned on.

Referring now to FIG. 1, a functional block diagram of a vehicle 100 having an example vehicle securement system 104 configured to provide a Secure Idle feature according to the principles of the present application is illustrated. While the techniques of the present application are described with specific reference to electrified vehicles, it will be appreciated that these techniques could also be applicable to internal combustion engine-based vehicles. The vehicle 100 comprises an electrified powertrain 108 comprising one or more electric motors 112 powered by a high voltage (HV) battery system 116 to generate drive torque. This drive torque could be transferred to a driveline 120 via an automatic transmission 124 for vehicle propulsion, or could be utilized in other ways, such as for powering an optional BSG unit 128 associated with an optional internal combustion engine 132 or for generating electrical power for V2X output (e.g., via a power panel 136 having a set of power outlets) and/or for recharging the high voltage battery systems 116 and/or a low voltage ("LV," e.g., 12 volt) battery system 140. A driver interface 144 is configured for driver input/output and could include, for example, a touch display 148 or other HMI device, a brake pedal 152, and a shifter device 156 for selecting, for example, states from park, reverse, neutral, and drive (PRND).

A park pawl 160 is configured to selectively engage/disengage to physically lock up the transmission 124 and the driveline 120. Optional park pawl (PP) sensor(s) 164 monitor a status/position of the park pawl 160. An optional on-board (OB) charger system 168 could also be provided to selectively connect to a charging cord/cable (not shown) of an external charging station 180, which are also collectively referred to as EVSE 172. A control system 184 is configured to, among other functions, control operation of the electrified vehicle 100 and its electrified powertrain 108, which is described in greater detail below.

Figure 2:
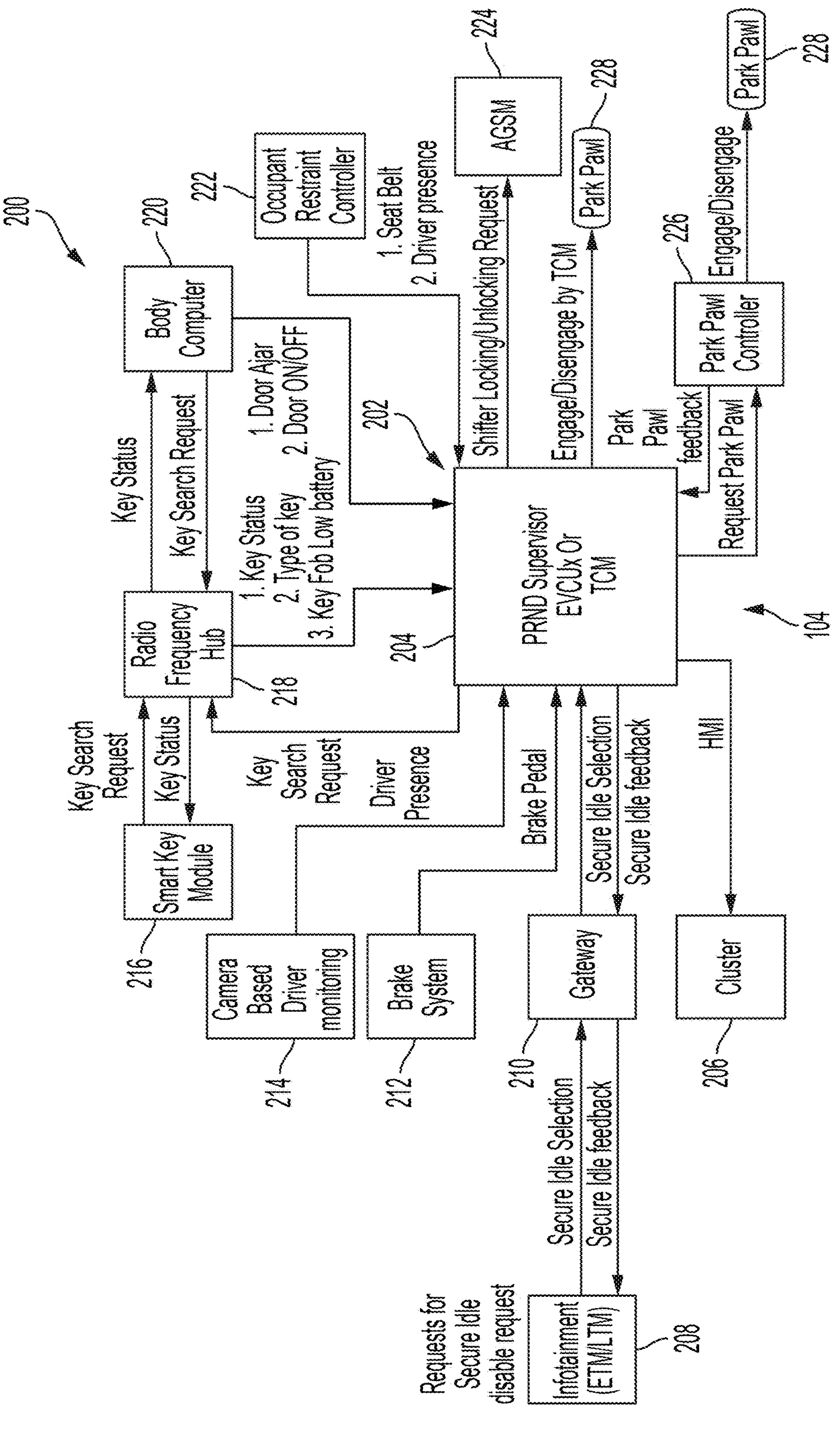
FIG. 2 is a functional block diagram of an example securement system architecture according to the principles of the present application.

FIG. 2 illustrates an example securement system architecture 200, including the various modules/devices and their communication lines/connections on a vehicle controller area network (CAN) 202. In the example embodiment, the vehicle securement system 104 includes a supervisory controller 204, which may include an electronic vehicle controller unit (EVCU) and/or a transmission control module (TCM). The supervisory controller 204 is in signal communication with an instrument panel cluster 206, an infotainment/telematics module (ETM/LTM) 208, a secure gateway module (SGWM) 210, a brake system controller 212, a camera-based driver monitoring system 214, a smart key module 216, a radio frequency hub module (RFHM) 218, a body computer or a body control module (BCM) 220, an occupant restraint controller 222, an automated gear shifter management (AGSM) system 224, and a park pawl supervisory controller 226.

The supervisory controller 204 includes one or more controllers (e.g., EVCU, TCM) configured to control operations of the vehicle 100. For example, controller 204 is configured to arbitrate park, reverse, neutral, and drive (PRND) after the driver selects a position through shifter inputs. In some cases, the controller 204 controls the park pawl system directly. For example, the TCM is a controller for controlling the transmission 124, including engaging and disengaging a park pawl 228. In EVs or range extended electric vehicles (REEVs), the park pawl 228 can be managed directly by a motor processor controller (not shown) and/or the park pawl controller 226.

The instrument panel cluster 206 and infotainment module 208 include any human machine interface (HMI), such as a driver information center and/or vehicle infotainment system (e.g., touchscreen display) capable of receiving input from a driver. In the example embodiment, the instrument panel cluster 206, also referred to as HMI 206, is configured to provide various notifications to the user, as described herein. The infotainment module 208, also referred to as HMI 208, is configured to receive user input to enable/disable the Secure Idle feature, as also described herein. The SGWM 210 enables secure communication between the supervisory controller 204 and the infotainment module 208.

The brake system controller 212 is configured to control one or more vehicle brakes based on user input from brake pedal 152, as well as one or more electronic parking brakes (not shown) when present. The camera-based driver monitoring system 214 is part of an advanced driver assist system (ADAS) and/or autonomous driving system (not shown) and includes an interior camera configured to provide one or more input signals indicative of whether or not the driver is physically present in the vehicle.

The smart key module 216 is a module configured to communicate with one or more authorized key fob devices associated with the vehicle 100. The smart key module 216 is also configured to enable an authorized portable electronic device (e.g., smart phone) to be utilized as a key (similar to the key fob) to control one or more vehicle functions, such as door lock/unlock and ignition ON. The RFHM 218 is configured to wirelessly detect one or more authorized vehicle keys, as well as support communication between the supervisory controller 204, the smart key module 216, and the body computer 220. The body computer 220 is configured to detect a status of the driver door (e.g., open/closed, present/not present), as well as request a key search operation and key status determination, as described herein.

The occupant restraint controller 222 is configured to determine a seat belt status (e.g., buckled, unbuckled) and/or a driver presence status (e.g., based on a seat sensor). The AGSM system 224 is in signal communication with a transmission shift request device, such as the electronic shifter 156, for the driver to request a desired gear of the transmission 124. The shifter 156 can provide conventional transmission options including park, reverse, neutral, drive and low (PRNDL). The park pawl controller 226 is in signal communication with the supervisory controller 204 and is configured to engage/disengage the park pawl 228.

It will be appreciated that while individual control units are discussed herein and shown in various Figures, the individual control units may also be optionally implemented in the form of one control unit, such as a powertrain or vehicle control unit. Thus, it will be appreciated that while the discussion will continue with reference to the individual controllers discussed above, the discussion is equally applicable to the components of vehicle system 104 being controlled by one controller.

As previously described, the vehicle securement system 104 provides a Secure Idle feature configured to prevent the vehicle from being driven away when the vehicle is ON and the driver leaves the vehicle while in Park, by automatically engaging a vehicle park pawl or electronic parking brake. The Secure Idle feature may be selected on infotainment module 208 or may be automatically managed by supervisory controller 204. In some scenarios, a subsequent key authentication or key being present in the vehicle is required for the vehicle to shift out of Park. The system 104 provides multiple methods of key fob searching, and also utilizes driver presence mechanisms (e.g., 214, 222) to reduce the number of key searches to protect the key fob battery life. Because the key fob is required to be inside the vehicle in order drive away, the system reduces the number key fob searches in order to prevent battery drain thereof.

With reference now to FIGS. 3A-3D, an example method 300 of operating the vehicle securement system 104 with the Secure Idle feature is illustrated. While the vehicle securement system 104 and its components are specifically discussed for descriptive/illustrative purposes, it will be appreciated that the method 300 could be applicable to any suitable vehicle. In general, the method 300 checks for a key fob low battery status and takes appropriate measures, determines Secure Idle and door status, and then determines if conditions are met to disable the Secure Idle and allow the vehicle 100 to drive away.

Figure 3A:
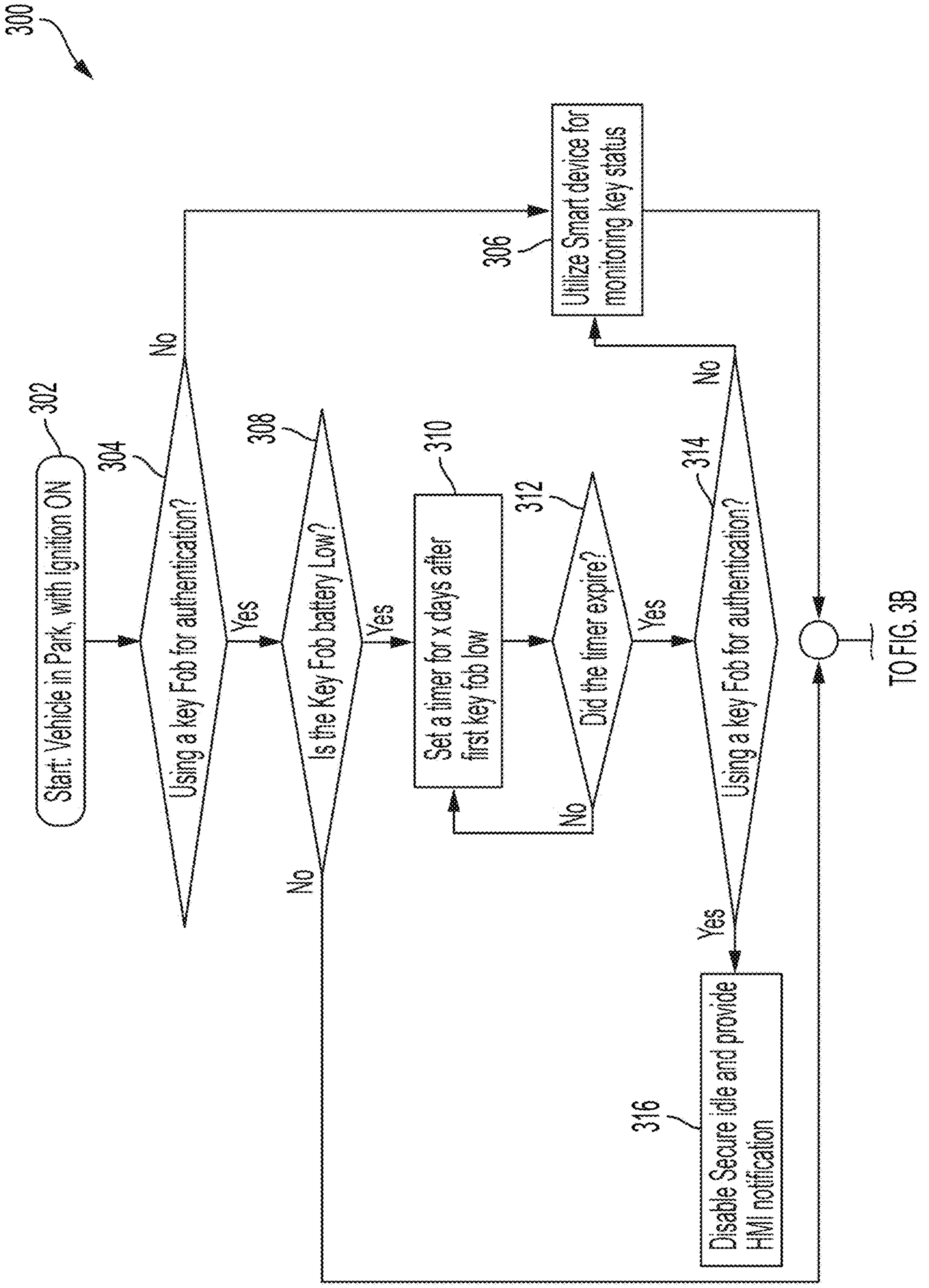
FIGS. 3A-3D are flow diagrams of an example electrified vehicle securement method according to the principles of the present application.
Figure 3B:
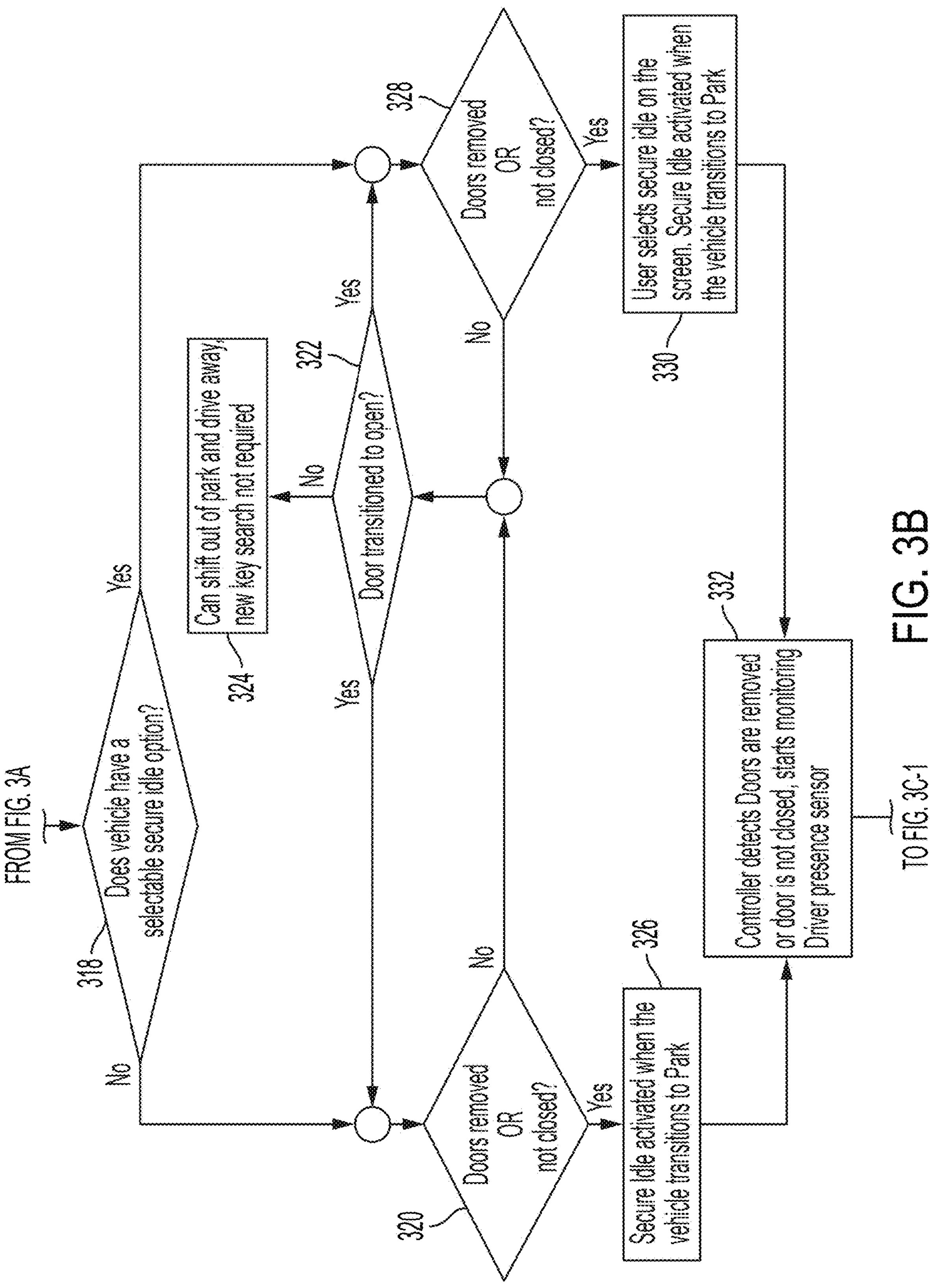
Figures 1, 3C:
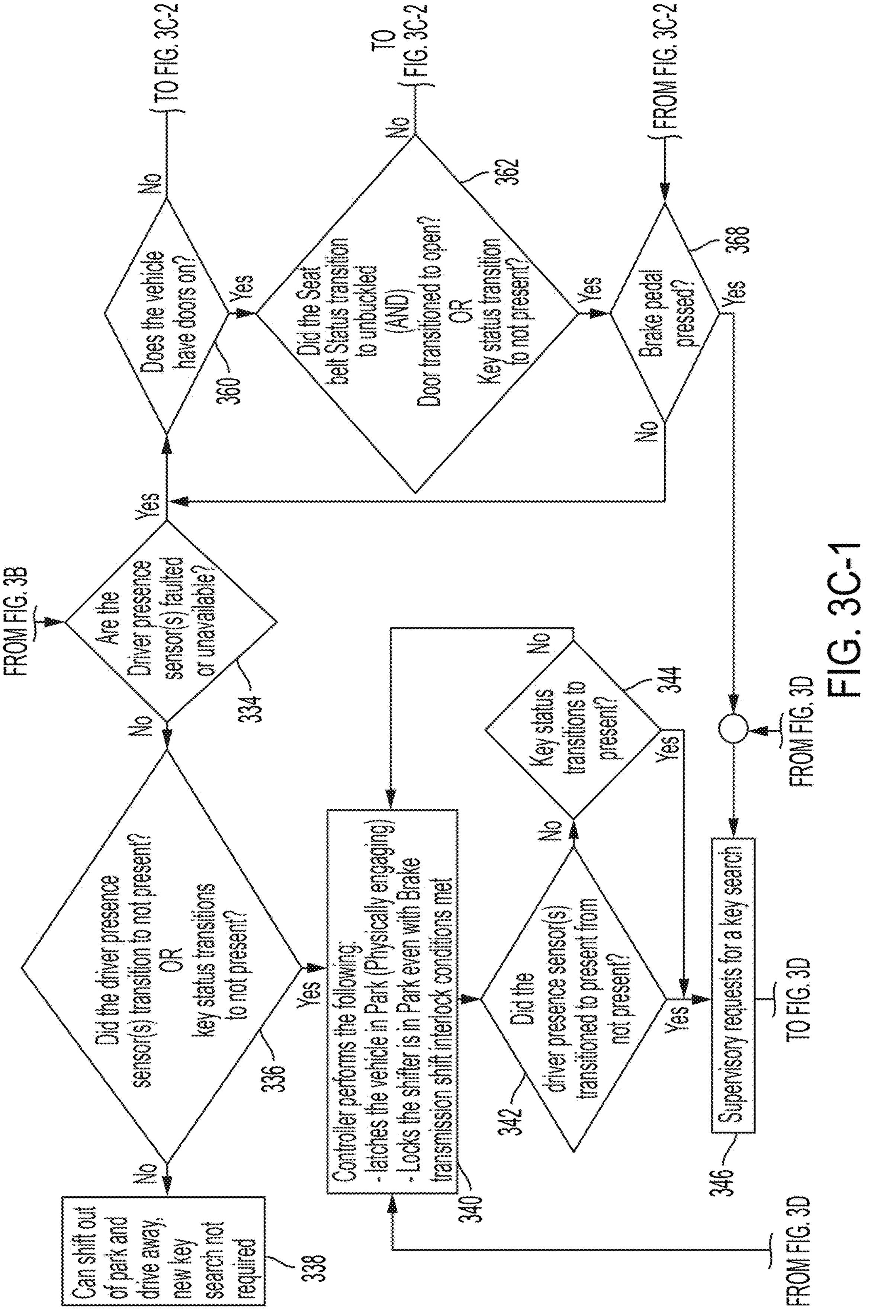
Figures 2, 3C:
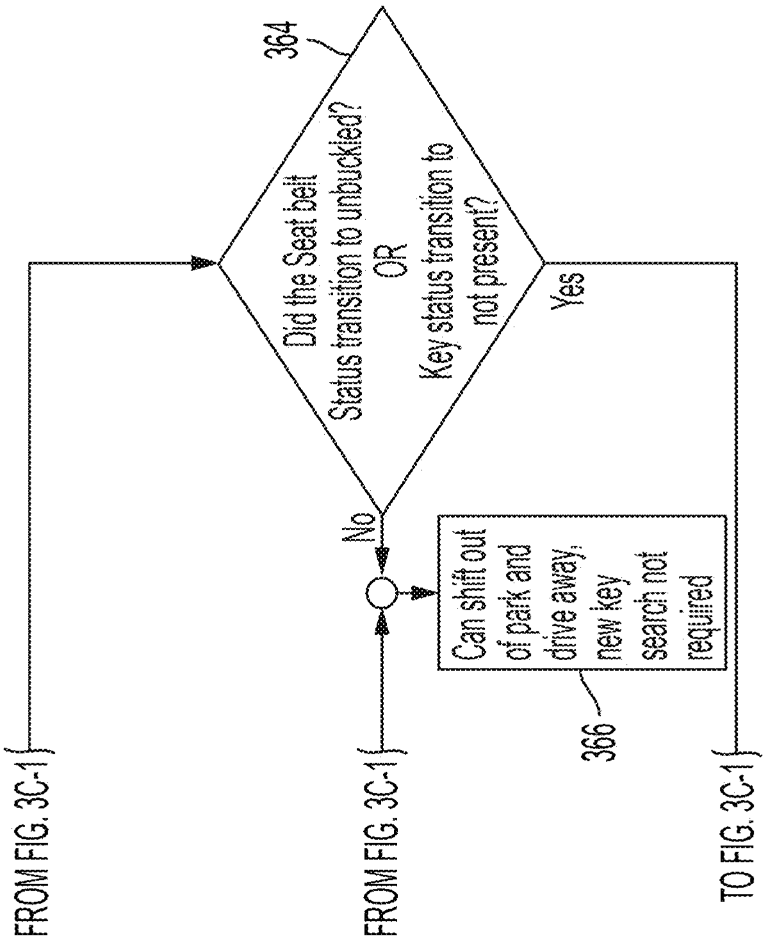
Figure 3D:
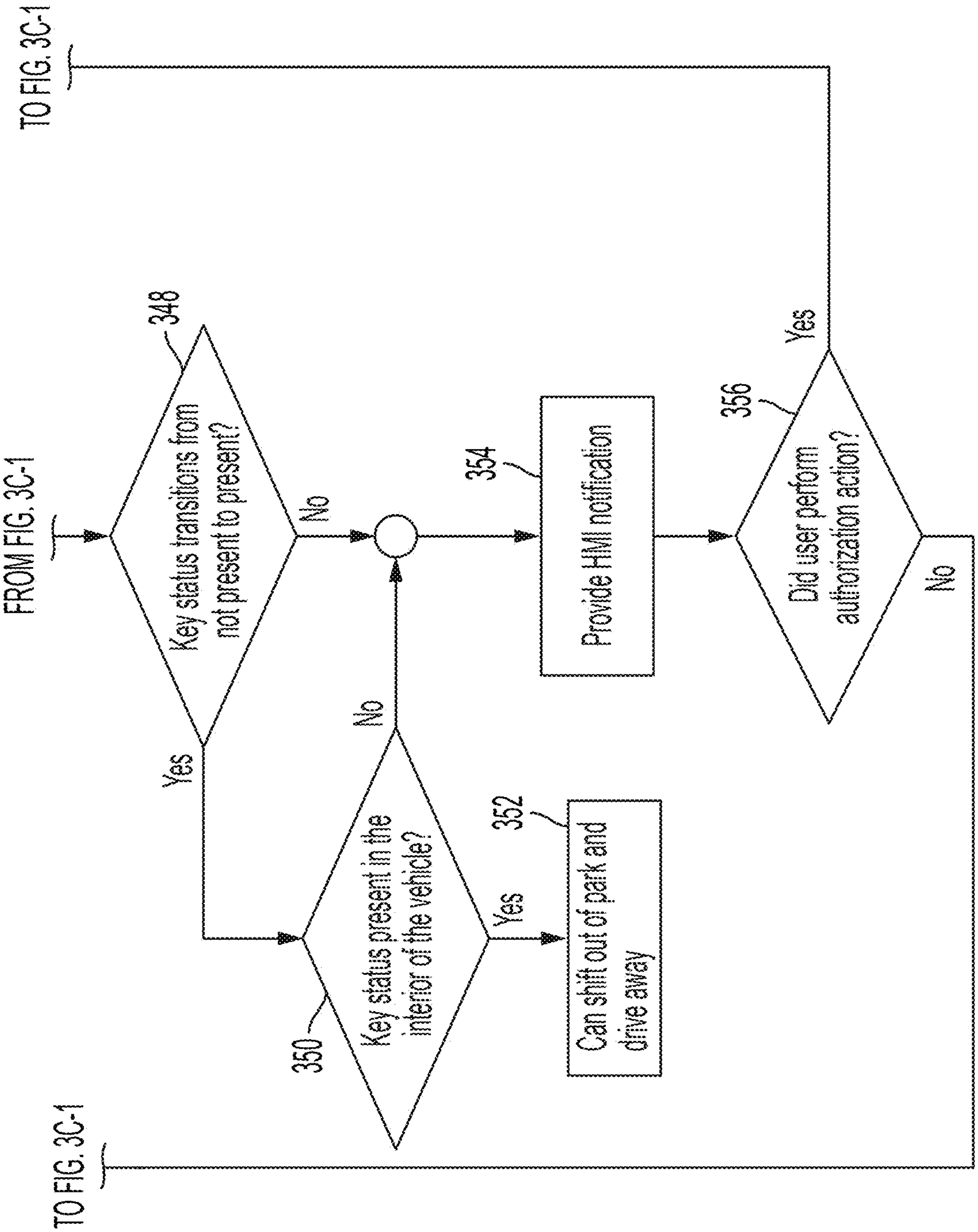

The method 300 beings at step 302 when the vehicle 100 is in Park with the ignition ON. At 304, the supervisory controller 204 ("control") determines if the driver is using a key fob for authentication to enable control of vehicle features. This may be done based on one or more signals from smart key module 216 and/or RFHM 218. If no key fob, control proceeds to 306 and utilizes an authorized portable electronic device for monitoring key status, and then proceeds to 318 (FIG. 3B). If using a key fob, control proceeds to step 308 and determines if the key fob battery is below a predetermined threshold indicating a low battery. If no, control proceeds to step 318 (FIG. 3B). If yes, control proceeds to step 310.

At 310, control sets a timer (e.g., 15 days) for a predetermined period of time after the first indication of a key fob low battery. Control may also provide an HMI notification on cluster 206 indicating a key fob low battery. At 312, control determines if the timer has expired. If no, control returns to step 310 and/or may proceed to step 318. If the timer has expired, control proceeds to 314 and determines if the driver is using the key fob for authentication. If yes, control proceeds to step 316 and disables the Secure Idle feature, and provides an HMI notification on cluster 206 indicating the Secure Idle is disabled due to the key fob low battery. If no, control proceeds to 306.

At step 318 (FIG. 3B), control determines if the vehicle 100 includes a user-selectable Secure Idle option, for example, provided via infotainment module 208. If no, control proceeds to 320. If yes, control proceeds to 328.

At step 320, control determines if the driver door is removed or not closed. This may be determined via one or more signals from body computer 220. If yes, control proceeds to step 326. If no, control proceeds to step 322 and determines if the driver door is transitioned to open. If yes, control returns to step 320. If no, control proceeds to step 324 and enables the user to shift out of Park and drive away the vehicle 100. In this scenario, a new key search/re-authentication is not required.

If the driver door is removed or not closed at step 320, control proceeds to 326 and actives the Secure Idle feature by engaging the park pawl 228. The vehicle 100 is shifted to Park if not already, and control may provide an HMI notification on cluster 206 indicating the Secure Idle is active. Control then proceeds to step 332.

Returning to step 328, when the vehicle has a user-selectable Secure Idle, control determines if the driver door is removed or not closed. If yes, control proceeds to step 330. If no, control proceeds to step 322 and determines if the driver door is transitioned to open. If no, control proceeds to step 324, as described previously. If yes, control returns to step 328. At step 330, control determines the user has selected the Secure Idle feature, for example on infotainment module 208, and then actives the Secure Idle feature and provides an HMI notification on cluster 206 indicating the Secure Idle is active. Control then proceeds to step 332.

At step 332, control monitors for a driver presence, for example, via a seat sensor of the occupant restraint controller 222 and/or the camera-based driver monitoring system 214. At step 334 (FIG. 3C), control determines if the driver presence sensor(s) are faulted or unavailable. If no, control proceeds to step 336. If yes, control proceeds to step 360.

At step 336, control determines if (i) the driver presence sensor(s) have transitioned from 'present' to 'not present' and the key status does not transition from 'present' to 'not present' OR (ii) to key status transitions from 'present' to 'not present.' If no, control proceeds to 338 and allows the driver to shift out of Park and drive away. A new key search/re-authentication is not required. If yes, control proceeds to step 340 and latches the vehicle in Park (physically engaging), and locks the shifter device 156 in Park even if brake transmission shift interlock conditions are met.

At 342, control determines if the driver presence sensor(s) transitioned from 'not present' to 'present.' If yes, control proceeds to step 346. If no, control proceeds to 344 and determines if the key status transitions from 'not present' to 'present'. If no, control returns to step 340. If yes, control proceeds to step 346.

At 346, control requests a key search to determine if the key is present within a predetermined vicinity of the vehicle 100. This may be done by the supervisory controller 204, body computer 220 and/or smart key module 216 sending a key search request to the RFHM 218, which subsequently performs the vicinity search by sending a signal (e.g., Bluetooth) and waiting for a response signal from the key. The RFHM 218 then returns a key status to supervisory controller 204, body computer 220 and/or smart key module 216 indicating whether the key is present or not.

At 348, control determines if the key is present, for example, based on a key status signal from RFHM 218. If the key is not present, control proceeds to step 354. If the key is present, at 350, control determines if the key is present within an interior of the vehicle 100. If yes, at 352, control allows the vehicle to shift out of Park and drive away. If no, control proceeds to 354 and provides an HMI notification indicating that key authorization is required for driveability. At 356, control determines if the user has performed the key authorization action. While authorization may take many forms, in one example, authorization requires the driver to perform an unlock of the vehicle, which triggers a new key search and subsequent detection/authentication. If the authorization action is not performed, control returns to 340. If the authorization action is performed, control returns to 346.

Returning now to step 334 (FIG. 3C), if the driver presence sensor(s) are faulted or unavailable, control proceeds to 360 and determines if the driver door is present (not removed). If yes, control proceeds to 362. If no, control proceeds to 364. At 362, control determines if (i) the seat belt status transitioned from buckled to unbuckled AND one of (ii) the driver door transitioned from closed to open OR (iii) the key status transitioned from 'present' to 'not present.' If no, control proceeds to 366 and allows the user to shift out of Park and drive away without a new key search. If yes, control proceeds to 368.

At 364, when the driver door is not present, control determines if the (i) seat belt status transitioned from buckled to unbuckled OR (ii) the key status transitioned from 'present' to not 'present.' If no, control proceeds to 366. If yes, control proceeds to 368 and determines if the brake pedal 152 is subsequently pressed. If yes, control proceeds to 346 and performs operations as previously described. If no, control returns to 360. Control may then end or return to step 302 for one or more cycles.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A vehicle system having an automatic vehicle securement feature to prevent a vehicle from driving away, the vehicle system comprising:

a shifter configured to move the vehicle between Park, Reverse, Neutral, and Drive (PRND) positions;

a brake system controller configured to selectively engage and disengage a park pawl;

an occupant restraint controller configured to determine a buckled or unbuckled status of a driver seat belt;

a body computer configured to determine if a driver door is ajar or removed from the vehicle;

a driver presence sensor configured to determine a driver presence within the vehicle;

a radio frequency hub module (RFHM) configured to detect a key status of a key associated with the vehicle; and a controller, having one or more processors, in signal communication with the shifter, the brake system controller, the occupant restraint controller, the body computer, the driver presence sensor, and the RFHM, the controller programmed to:

detect for the key associated with the vehicle;

detect if the driver door is ajar or removed;

initiate the automatic vehicle securement feature, if (i) requested by a user, or (ii) if the shifter is moved to Park and the driver door is ajar or removed, and engage the park pawl to thereby prevent the vehicle from driving away;

monitor the driver presence sensor;

physically lock the shifter while the vehicle is in Park and keep the park pawl engaged without regard to a requested non-park state from the shifter, if (i) the driver presence transitions to 'not present' or (ii) the key status indicates the key status transitions to 'not present';

request a key search if the driver presence transitions to 'present';

disengage the park pawl in response to the requested non-park state from the shifter when the requested key search indicates the key is 'present';

detect the key is a key fob associated with the vehicle;

detect the key fob has a low battery;

set a timer the first time the key fob is detected as having the low battery; and disable the automatic vehicle securement feature if the timer has expired.

2. The vehicle system of claim 1, wherein the controller is further programmed to:

request a key authorization when the requested key search indicates the key is 'not present'.

3. The vehicle system of claim 2, wherein the controller is further programmed to:

request a second key search if a user performs the key authorization; and disengage the park pawl in response to the requested non-park state from the shifter when the requested second key search indicates the key is 'present'.

4. The vehicle system of claim 2, wherein the key authorization requires a user to perform a vehicle unlock operation with the key.

5. The vehicle system of claim 1, wherein the controller is further programmed to:

detect the driver presence sensor is faulted or unavailable;

disengage the park pawl in response to the requested non-park state from the shifter when the driver door is removed and at least one of (i) the driver seat belt is buckled, and (ii) the key status indicates the key is 'present'; and request a second key search if a brake pedal is pressed, and at least one of (i) the driver seat belt is unbuckled, and (ii) the key status indicates the key is 'not present', and subsequently disengage the park pawl in response to the requested non-park state from the shifter when the requested second key search indicates the key is 'present'.

6. The vehicle system of claim 1, wherein the driver presence sensor is a seat sensor.

7. The vehicle system of claim 1, wherein the driver presence sensor is an interior camera of a camera-based driver monitoring system.

8. A vehicle system having an automatic vehicle securement feature to prevent a vehicle from driving away, the vehicle system comprising:

a shifter configured to move the vehicle between Park, Reverse, Neutral, and Drive PRND) positions;

a brake system controller configured to selectively engage and disengage a park pawl;

an occupant restraint controller configured to determine a buckled or unbuckled status of a driver seat belt;

a body computer configured to determine if a driver door is ajar or removed from the vehicle;

a driver presence sensor configured to determine a driver presence within the vehicle;

a radio frequency hub module (RFHM) configured to detect a key status of a key associated with the vehicle; and a controller, having one or more processors, in signal communication with the shifter, the brake system controller, the occupant restraint controller, the body computer, the driver presence sensor, and the RFHM, the controller programmed to:

detect for the key associated with the vehicle;

detect if the driver door is ajar or removed;

initiate the automatic vehicle securement feature, if (i) requested by a user, or (ii) if the shifter is moved to Park and the driver door is ajar or removed, and engage the park pawl to thereby prevent the vehicle from driving away;

monitor the driver presence sensor;

physically lock the shifter while the vehicle is in Park and keep the park pawl engaged without regard to a requested non-park state from the shifter, if (i) the driver presence transitions to 'not present' or (ii) the key status indicates the key status transitions to 'not present';

request a key search if the driver presence transitions to 'present';

disengage the park pawl in response to the requested non-park state from the shifter when the requested key search indicates the key is 'present';

detect the driver presence sensor is faulted or unavailable;

disengage the park pawl in response to the requested non-park state from the shifter when the driver door is present and (i) the driver seat belt is buckled and the driver door is closed, and (ii) the key status indicates the key is 'present'; and request a second key search if a brake pedal is pressed, and at least one of (i) the driver seat belt is unbuckled and the driver door is ajar, and (ii) the key status indicates the key is 'not present', and subsequently disengage the park pawl in response to the requested non-park state from the shifter when the requested second key search indicates the key is 'present'.

9. The vehicle system of claim 8, wherein the controller is further programmed to:

detect the key is a key fob associated with the vehicle;

detect the key fob has a low battery;

set a timer the first time the key fob is detected as having the low battery; and disable the automatic vehicle securement feature if the timer has expired.

10. The vehicle system of claim 8, wherein the controller is further programmed to:

request a key authorization when the requested key search indicates the key is 'not present'.

11. The vehicle system of claim 10, wherein the controller is further programmed to:

request a third key search if a user performs the key authorization; and disengage the park pawl in response to the requested non-park state from the shifter when the requested third key search indicates the key is 'present'.

12. The vehicle system of claim 10, wherein the key authorization requires a user to perform a vehicle unlock operation with the key.

13. A computer-implemented method of operating a vehicle system having an automatic vehicle securement feature to prevent a vehicle from driving away, the vehicle including a shifter configured to move the vehicle between Park, Reverse, Neutral, and Drive (PRND) positions, a brake system controller configured to selectively engage and disengage a park pawl, an occupant restraint controller configured to determine a buckled or unbuckled status of a driver seat belt, a body computer configured to determine if a driver door is ajar or removed from the vehicle, a driver presence sensor configured to determine a driver presence within the vehicle, a radio frequency hub module (RFHM) configured to detect a key status of a key associated with the vehicle, and a controller having one or more processors and a non-transitory computer-readable storage medium, the method comprising:

detecting, by the controller, the key associated with the vehicle;

detecting, by the body computer, if the driver door is ajar or removed;

initiating, by the controller, the automatic vehicle securement feature, if (i) requested by a user, or (ii) if the shifter is moved to Park and the driver door is ajar or removed, and engaging the park pawl to thereby prevent the vehicle from driving away;

monitoring, by the controller, the driver presence sensor;

physically locking the shifter, by the controller, while the vehicle is in Park and keeping the park pawl engaged without regard to a requested non-park state from the shifter, if (i) the driver presence transitions to 'not present' or (ii) the key status indicates the key status transitions to 'not present';

requesting, by the controller, a key search if the driver presence transitions to 'present';

disengaging the park pawl in response to the requested non-park state from the shifter when the requested key search indicates the key is 'present';

detecting, by the controller, the driver presence sensor is faulted or unavailable;

disengaging, by the controller, the park pawl in response to the requested non-park state from the shifter when the driver door is removed and at least one of (i) the driver seat belt is buckled, and (ii) the key status indicates the key is 'present'; and requesting, by the controller, a second key search if a brake pedal is pressed, and at least one of (i) the driver seat belt is unbuckled, and (ii) the key status indicates the key is 'not present', and subsequently disengaging the park pawl in response to the requested non-park state from the shifter when the requested second key search indicates the key is 'present'.

14. The method of claim 13, further comprising requesting, by the controller, a key authorization when the requested key search indicates the key is 'not present'.

15. The method of claim 14, further comprising:

requesting, by the controller, a third key search if a user performs the key authorization; and disengaging, by the controller, the park pawl in response to the requested non-park state from the shifter when the requested third key search indicates the key is 'present'.

16. The method of claim 14, wherein the key authorization requires a user to perform a vehicle unlock operation with the key.

17. The method of claim 13, further comprising:

detecting, by the controller, the key is a key fob associated with the vehicle;

detecting, by the controller, the key fob has a low battery;

setting, by the controller, a timer the first time the key fob is detected as having the low battery; and disabling, by the controller, the automatic vehicle securement feature if the timer has expired.

18. The method of claim 13, further comprising:

disengaging, by the controller, the park pawl in response to the requested non-park state from the shifter when the driver door is present and (i) the driver seat belt is buckled and the driver door is closed, and (ii) the key status indicates the key is 'present'; and requesting, by the controller, the second key search if a brake pedal is pressed, and at least one of (i) the driver seat belt is unbuckled and the driver door is ajar, and (ii) the key status indicates the key is 'not present', and subsequently disengaging the park pawl in response to the requested non-park state from the shifter when the requested second key search indicates the key is 'present'.

19. The method of claim 13, wherein the driver presence sensor is a seat sensor.

20. The method of claim 13, wherein the driver presence sensor is an interior camera of a camera-based driver monitoring system.

* * * * *